(12) United States Patent
Bergstra et al.

(10) Patent No.: US 9,079,988 B2
(45) Date of Patent: Jul. 14, 2015

(54) PREPARATION OF PROPYLENE COPOLYMER WITH DYNAMICALLY OPERATED REACTOR

(75) Inventors: Michiel Bergstra, Berchem (BE); John Severn, Eindhoven (NL); Torvald Vestberg, Porvoo (FI); Pauli Leskinen, Helsinki (FI); Bo Malm, Espoo (FI); Olli Tuominen, Helsinki (FI); Pirjo Jääskeläinen, Porvoo (FI)

(73) Assignee: Borealis AG, Vienna (AT)

( * ) Notice: Subject to any disclaimer, the term of this patent is extended or adjusted under 35 U.S.C. 154(b) by 1132 days.

(21) Appl. No.: 12/998,307

(22) PCT Filed: Oct. 6, 2009

(86) PCT No.: PCT/EP2009/062944
§ 371 (c)(1),
(2), (4) Date: May 25, 2011

(87) PCT Pub. No.: WO2010/040731
PCT Pub. Date: Apr. 15, 2010

(65) Prior Publication Data
US 2011/0224387 A1 Sep. 15, 2011

(30) Foreign Application Priority Data
Oct. 8, 2008 (EP) .................................. 08017631

(51) Int. Cl.
*C08F 2/38* (2006.01)
*C08F 2/00* (2006.01)
*C08F 4/64* (2006.01)
*C08F 210/06* (2006.01)
*C08F 210/16* (2006.01)

(52) U.S. Cl.
CPC ............ *C08F 210/06* (2013.01); *C08F 210/16* (2013.01); *C08F 2400/02* (2013.01)

(58) Field of Classification Search
USPC ............. 526/64, 65, 921, 922, 159, 348, 905
See application file for complete search history.

(56) References Cited

U.S. PATENT DOCUMENTS

| | | | |
|---|---|---|---|
| 3,472,829 A | 10/1969 | Claybaugh et al. | |
| 3,798,288 A * | 3/1974 | McManimie et al. | 525/268 |
| 4,107,414 A | 8/1978 | Giannini et al. | |
| 4,186,107 A | 1/1980 | Wagner | |
| 4,226,963 A | 10/1980 | Giannini et al. | |
| 4,347,160 A | 8/1982 | Epstein et al. | |
| 4,382,019 A | 5/1983 | Greco | |
| 4,433,110 A * | 2/1984 | Baba et al. | 525/323 |
| 4,435,550 A | 3/1984 | Ueno et al. | |
| 4,465,782 A | 8/1984 | McKenzie | |
| 4,472,524 A | 9/1984 | Albizzati | |
| 4,473,660 A | 9/1984 | Albizzati et al. | |
| 4,522,930 A | 6/1985 | Albizzati et al. | |
| 4,530,912 A | 7/1985 | Pullukat et al. | |
| 4,532,313 A | 7/1985 | Matlack | |
| 4,552,930 A | 11/1985 | Hirota et al. | |
| 4,560,671 A | 12/1985 | Gross et al. | |
| 4,581,342 A | 4/1986 | Johnson et al. | |
| 4,657,882 A | 4/1987 | Karayannis et al. | |
| 6,300,420 B1 * | 10/2001 | Jaaskelainen et al. | 525/240 |
| 2004/0210012 A1 * | 10/2004 | Jaaskelainen et al. | 526/65 |

FOREIGN PATENT DOCUMENTS

| | | |
|---|---|---|
| CN | 1163621 A | 10/1997 |
| DE | 19930594 | 1/2001 |
| DE | 19930594 A1 | 1/2001 |
| EP | 0 045 976 | 2/1982 |
| EP | 0 045 977 | 2/1982 |
| EP | 0 607 703 | 7/1994 |
| EP | 0 704 463 | 4/1996 |
| EP | 1 028 985 | 8/2000 |
| EP | 1 030 878 | 8/2000 |
| WO | WO 87/07620 | 12/1987 |
| WO | WO 91/11216 | 8/1991 |
| WO | WO 91/14718 | 10/1991 |
| WO | WO 92/19653 | 11/1992 |
| WO | WO 92/19658 | 11/1992 |
| WO | WO 92/19659 | 11/1992 |
| WO | WO 92/21705 | 12/1992 |
| WO | WO 93/11165 | 6/1993 |
| WO | WO 93/19100 | 9/1993 |
| WO | WO 95/32994 | 12/1995 |
| WO | 9611216 A1 | 4/1996 |
| WO | WO 97/36939 | 10/1997 |
| WO | WO 98/12234 | 3/1998 |
| WO | WO 99/24478 | 5/1999 |
| WO | WO 99/33842 | 7/1999 |
| WO | 0102444 A1 | 1/2001 |
| WO | WO 01/49751 | 7/2001 |
| WO | WO 03/000754 | 1/2003 |
| WO | WO 03/000757 | 1/2003 |
| WO | WO 2004/029112 | 4/2004 |

* cited by examiner

OTHER PUBLICATIONS

M. Al-Haj Ali et al; "Molecular Weight Distribution of Polypropylene by Periodic Switching of Hydrogens and Catalyst Additions"; Journal of Applied Polymer Science, vol. 108, pp. 2446-2457; 2008, Wiley Periodicals, Inc.

*Primary Examiner* — Fred M Teskin
(74) *Attorney, Agent, or Firm* — Warn Partners, P.C.

(57) ABSTRACT

The present invention relates to a process for the preparation of a propylene copolymer P1 having ethylene-derived comonomer units, which comprises the following steps: (i) introducing propylene, ethylene, and hydrogen into a polymerisation reactor R1, wherein the ethylene is fed to the polymerisation reactor R1 in a periodically varying amount, (ii) preparing the propylene copolymer in the polymerisation reactor R1 in the presence of a catalyst.

30 Claims, No Drawings

PREPARATION OF PROPYLENE COPOLYMER WITH DYNAMICALLY OPERATED REACTOR

This application is a National Stage of International Application No. PCT/EP2009/062944, filed Oct. 6, 2009. This application claims priority to European Patent Application No. 08017631.6 filed on Oct. 8, 2008. The disclosures of the above applications are incorporated herein by reference.

The present invention relates to a process for the preparation of a propylene copolymer by using a dynamically operated polymerisation reactor.

Polypropylene has many characteristics which makes it useful for applications ranging from food packaging (film, bottle) to more demanding applications like pipes, fittings, or foams.

In addition to beneficial mechanical and thermal properties, polypropylene materials should have good processability. It is known that processability of propylene polymers can be improved by broadening the molecular weight distribution (MWD) in a multi-stage polymerisation process wherein polymers which differ in average molecular weight are produced in each stage. A multi-stage polymerisation process is disclosed e.g. in patent application WO 91/14718.

A process for the production of a propylene/alpha-olefin copolymer having a high molecular weight and a broad molecular weight distribution is disclosed in WO 96/11216. The propylene copolymer has improved mechanical properties and shows good processability.

As indicated above, broadening of the MWD can be accomplished by using a multi-stage polymerisation process wherein two or more reactors are provided in serial configuration and each reactor is operated at different polymerisation conditions. In an alternative approach to the multistage reactor technology, it is also known to broaden MWD by varying polymerisation conditions within a single reactor. Thus, if compared to multistage reactor technology, the same technical effect (i.e. broadening of MWD) is accomplished in a single reactor, thereby improving process flexibility as a further reactor could now be used for other purposes, e.g. preparing an elastomeric phase to improve impact properties.

DE 199 30 594 A1 discloses a process for the preparation of a polyolefin, in particular polyethylene, having a broad molecular weight distribution or comonomer polydispersity, wherein at least one process parameter such as comonomer concentration, hydrogen concentration, or temperature is periodically varying.

U.S. Pat. No. 3,472,829 discloses a process for the preparation of polypropylene, wherein the average molecular weight of the polymer is controlled by introducing hydrogen into the reactor at a predetermined varying rate during repeated cycles. It is pointed out in U.S. Pat. No. 3,472,829 that, as an alternative to hydrogen, varying amounts of a higher olefin such as 1-butene might be used as well. However, the use of varying amounts of ethylene is not mentioned.

In a previous study, M. Al-Haj Ali et al., Journal of Applied Polymer Science, Vol. 108, pp. 2446-2457 (2008), discuss broadening of molecular weight distribution of polypropylene by periodic switching of hydrogen and/or catalyst feed. The study is restricted to propylene homopolymers. Furthermore, by making reference to another study, it is pointed out that manipulation of monomer flow rate is not sufficient to achieve the required MWD broadening.

However, periodically varying process parameters within a single reactor may adversely affect catalyst activity and productivity. As an example, significantly decreasing the amount of hydrogen fed to the reactor may result in low catalyst productivity. Any approach used for broadening molecular weight distribution should still maintain productivity on a high level.

Polypropylene random copolymers are a type of polypropylene in which the basic structure of the polymer chain has been modified by the incorporation of a different monomer molecule. This causes changes to the physical properties of the PP. In comparison with PP homopolymers, random copolymers exhibit improved optical properties (increased clarity and decreased haze), improved impact resistance, increased flexibility, and a decreased melting point, which also results in a lower heat-sealing temperature. At the same time they exhibit essentially the same chemical resistance, water vapour barrier properties, and organoleptic properties (low taste and odour contribution) as PP homopolymer. Random copolymer PPs were developed to combine improved clarity and impact strength, and are used in blow moulding, injection moulding, and extrusion applications.

However, although propylene random copolymers have a number of beneficial properties, it is still desired to provide a process that enables a further fine-tuning of these properties. As an example, there is still a need in a process by which the comonomer distribution within the polymer can easily be adjusted. For some applications, it may be advantageous that the comonomer content in the high molecular weight region is higher than in the low molecular weight region, whereas for other applications it is just the other way round. It would be useful to have a process which can provide both options by simply switching between different process parameters.

Thus, considering the statements made above, it is an object of the present invention to provide a process of high flexibility (e.g. with respect to the necessary number of polymerisation reactors and/or the fine-tuning of the comonomer distribution in the polymer) which enables the preparation of polypropylene with good processability, while still maintaining process productivity on a high level.

According to the present invention, the object is solved by providing a process for the preparation of a propylene copolymer P1 having ethylene-derived comonomer units, which comprises the following steps:

(i) introducing propylene, ethylene, and hydrogen into a polymerisation reactor R1, wherein the ethylene is fed to the polymerisation reactor R1 in a periodically varying amount, (ii) preparing the propylene copolymer P1 in the polymerisation reactor R1 in the presence of a catalyst.

As will be discussed below in further detail, it has turned out that the molecular weight distribution of a propylene copolymer having ethylene-derived comonomer units can already be broadened by feeding ethylene to the polymerisation reactor in a periodically varying amount.

Thus, the amount of ethylene in the feed stream to the polymerisation reactor R1 varies as a function of time and, as a consequence thereof, the concentration of ethylene within the polymerisation reactor R1 is periodically varying as well. However, as will be described in further detail below, the periodic variation in the feed stream might be different from the one in the reactor as the chemical system might need some time react to the modified input. As an example, the amount of ethylene fed to the reactor may vary in the form of a rectangular function (i.e. periodically switching on/off the ethylene feed) whereas the ethylene concentration within the reactor may vary in the form of a sinusoidal function.

In the present invention, it may be preferred that a prepolymerisation step in a prepolymerisation reactor $R_P$ is carried out before step (i), wherein said prepolymerisation step includes introducing propylene, ethylene, and hydrogen into the prepolymerisation reactor $R_P$ and the ethylene feed is provided in a periodically varying amount. The prepolymerisation step can be carried out in conventional prepolymerisation reactors known to the skilled person. Preferably, the prepolymerisation reactor $R_P$ is a continuous stirred reactor such as a slurry reactor (e.g. a loop reactor). However, other commonly known prepolymerisation reactors such as a continuous stirred tank reactor (CSTR) can be used as well.

As the ethylene feed to the prepolymerisation reactor $R_P$ is periodically varying, there is also a periodical variation of the ethylene concentration within the prepolymerisation reactor. Furthermore, when transferring the ethylene and the prepolymer from the prepolymerisation reactor to the reactor R1, which is preferably a slurry reactor such as a loop reactor, a periodically varying ethylene feed to the reactor R1 is obtained. In other words, in a preferred embodiment comprising a prepolymerisation reactor, the periodically varying ethylene feed to the reactor R1 results from periodic ethylene feed variations already generated in the prepolymerisation reactor.

In a preferred embodiment, the hydrogen is fed to the polymerisation reactor R1 and/or the prepolymerisation reactor $R_P$ in a periodically varying amount. As will be explained below in further detail, a varying amount of ethylene in combination with a varying amount of hydrogen which are fed to the polymerisation reactor R1 and/or the prepolymerisation reactor offer the possibility to easily fine-tune the comonomer distribution within the polymer, e.g. providing a propylene random copolymer with broad MWD and increased ethylene content in the higher molecular weight part, or vice versa.

Preferably, the amount of ethylene and optionally the amount of hydrogen in the feed stream(s) to the polymerisation reactor R1 and optionally to the prepolymerisation reactor varies/vary as a function of time in the form of a non-sinusoidal function, preferably in the form of a sawtooth function, a triangle function, a rectangular function, one or more pulse functions, one or more step functions, or any combination thereof.

Preferably, the periodic variation is accomplished by periodically switching on/off the feed stream(s) to the reactor R1 and/or the prepolymerisation reactor, thereby resulting in a periodic variation which can be described by a rectangular function or a pulse function.

Alternatively, the amount of ethylene and optionally the amount of hydrogen in the feed stream(s) to the polymerisation reactor R1 and optionally to the prepolymerisation reactor may vary as a function of time in the form of a sinusoidal function.

Preferably, the oscillation period $t_{OP}$(C2-feed) of the varying ethylene feed to the polymerisation reactor R1 and/or the prepolymerisation reactor $R_P$ is from 5 minutes to 90 minutes, more preferably 10 to 60 minutes, even more preferably 10 to 40 minutes.

If the hydrogen feed is varied as well, it is preferred that the oscillation period $t_{OP}$(H2-feed) of the hydrogen feed to the polymerisation reactor R1 and/or the prepolymerisation reactor $R_P$ is from 5 minutes to 90 minutes, more preferably 10 to 60 minutes, even more preferably 10 to 40 minutes.

In a preferred embodiment, the ethylene as well as hydrogen are provided in periodically varying amounts, wherein the ratio of the oscillation period $t_{OP}$(C2-feed) to the oscillation period $t_{OP}$(H2-feed) is from 1.2 to 0.8, more preferably 1.1 to 0.9, even more preferably 1.0 (i.e. oscillation periods $t_{OP}$(C2-feed) and $t_{OP}$(H2-feed) are the same).

In a preferred embodiment, the polymerisation reactor R1 has an average residence time $t_{RT-1}$, and the ratio of the oscillation period $t_{OP}$(C2-feed) of the ethylene feed to the average residence time $t_{RT-1}$ is within the range of 0.2 to 2.0, more preferably 0.25 to 1.0.

As indicated above, it is preferred that the oscillation periods $t_{OP}$(C2-feed) and $t_{OP}$(H2-feed) are the same. Thus, with respect to the preferred ratio of the oscillation period $t_{OP}$(H2-feed) of the hydrogen feed to the average residence time $t_{RT-1}$, reference can be made to the statements made above.

In general, the average residence time is defined as the ratio of the reaction volume $V_R$ to the volumetric outflow rate from the reactor $Q_o$ (i.e. $V_R/Q_o$). In case of a loop reactor or a liquid-filled continuous stirred tank reactor (CSTR), VR equals to the reactor volume; in case of a normal CSTR, it equals to the volume of the slurry within the reactor.

In a preferred embodiment, the periodically varying ethylene feed and the periodically varying hydrogen feed are phase-shifted by from 160° to 200°, more preferably 170° to 190°, even more preferably 180°. In other words, when the amount of ethylene fed to the reactor is close to or equal to its maximum, the amount of hydrogen fed to the reactor is close to or equal to its minimum, and vice versa. Such a phase shift between the maxima of ethylene feed and hydrogen feed enables the production of a propylene copolymer with broader MWD and having an increased ethylene content in the higher molecular weight part.

As an alternative, it may also be preferred that the periodically varying ethylene feed and the periodically varying hydrogen feed are in phase, thereby enabling the production of a propylene copolymer with broader MWD and having an increased ethylene content in the lower molecular weight part.

Preferably, the maximum hydrogen to propylene feed ratio to the reactor R1 and/or the prepolymerisation reactor is from 0.02 to 2.0 mol/kmol, more preferably 0.05 to 1.5 mol/kmol, even more preferably 0.05 to 1.0 mol/kmol and the minimum hydrogen to propylene feed ratio to the reactor R1 and/or the prepolymerisation reactor is from 0 mol/kmol to 50% of the maximum hydrogen to propylene feed ratio, more preferably 0 mol/kmol to 25% of the maximum hydrogen to propylene feed ratio, even more preferably 0 mol/kmol.

Preferably, the propylene copolymer P1 has an amount of ethylene-derived comonomer units within the range of 0.5 wt % to 5.0 wt %, more preferably 1.0 wt % to 4.5 wt %, even more preferably 1.5 wt % to 4.5 wt %.

Preferably, the polymerisation reactor R1 is a slurry reactor, e.g. a loop reactor.

In a preferred embodiment, the polymerisation reactor R1, which is preferably a loop reactor, has an average residence time of 10 to 90 minutes, more preferably 15 to 70 minutes.

The loop reactor can be operated under usual conditions known to the skilled person. Preferably, the loop reactor is operated at a temperature of 65 to 90° C., more preferably 68 to 80° C., and a pressure of 20 to 80 bar, more preferably 35 to 60 bar.

If a prepolymerisation step is carried out in a prepolymerisation reactor before step (i), said prepolymerisation reactor is preferably operated at a temperature of 5 to 60° C., more preferably 20 to 60° C., and a pressure of 20 to 80 bar, more preferably 35 to 60 bar. As already indicated above, the prepolymerisation reactor is preferably a continuous stirred reactor. More preferably, it is a slurry reactor such as a loop reactor. However, other commonly used types of prepolymerisation reactors known to the skilled person can be used as well, e.g. a continuous stirred tank reactor (CSTR).

In polymerisation reactor R1, any catalyst commonly known for the preparation of polypropylene can be used.

Preferred catalysts include Ziegler-Natta catalysts and single site catalysts such as metallocene-containing catalysts.

Preferably, the catalyst in the reactor R1 is a Ziegler-Natta catalyst.

Typically, a Ziegler-Natta catalyst comprises a solid transition metal component and a cocatalyst. The solid transition metal component preferably comprises a magnesium halide and a transition metal compound. These compounds may be supported on a particulate support, such as inorganic oxide, like silica or alumina, or the magnesium halide itself may form the solid support. Examples of such catalysts are disclosed e.g. in WO 87/07620, WO 92/21705, WO 93/11165, WO 93/19100, WO 97/36939, WO 98/12234, WO 99/33842, WO 03/000757, WO 03/000754, and WO 2004/029112.

In addition to the magnesium halide and transition metal compound, the solid transition metal component usually also comprises an electron donor (internal electron donor). Suitable electron donors are, among others, esters of carboxylic acids, like phthalates, citraconates, and succinates. Also oxygen- or nitrogen-containing silicon compounds may be used. Examples of suitable compounds are disclosed in WO 92/19659, WO 92/19653, WO 92/19658, U.S. Pat. Nos. 4,347,160, 4,382,019, 4,435,550, 4,465,782, 4,473,660, 4,530,912, and 4,560,671.

Preferred solid catalyst components are disclosed in WO 2004/029112. In a preferred embodiment of the present invention, the solid catalyst component is prepared by a process comprising the following steps: (i) preparing a solution of a magnesium complex by reacting an alkoxy magnesium compound and an electron donor or precursor thereof in a $C_6$ to $C_{10}$ aromatic liquid reaction medium, (ii) reacting said magnesium complex with a compound of at least one four-valent Group 4 metal at a temperature greater than 10° C. and less than 60° C. to produce an emulsion of a denser, $TiCl_4$/toluene-insoluble, oil dispersed phase having Group 4 metal/Mg molar ratio of 0.1 to 10 in an oil disperse phase having Group 4 metal/Mg molar ratio of 10 to 100, (iii) agitating the emulsion, optionally in the presence of an emulsion stabilizer and/or a turbulence minimizing agent, in order to maintain the droplets of said dispersed phase within an average size range of 5 to 200 μm. The catalyst particles are obtained after solidifying said particles of the dispersed phase by heating. In said process, an aluminum alkyl compound of the formula $AlR_{3-n}X_n$, where R is an alkyl group of 1 to 20, preferably 1 to 10 carbon atoms, X is a halogen and n is 0, 1, 2 or 3, may be added and brought into contact with the droplets of the dispersed phase of the agitated emulsion before recovering the solidified particles.

The cocatalyst used in combination with the transition metal compound typically comprises an aluminum alkyl compound. The aluminum alkyl compound is preferably trialkyl aluminum such as trimethylaluminum, triethylaluminum, tri-isobutylaluminum, or tri-n-octylaluminum. However, it may also be an alkylaluminum halide, such as diethylaluminum chloride, dimethylaluminum chloride, and ethylaluminum sesquichloride. It may also be an alumoxane, such as methylalumoxane (MAO), tetraisobutylalumoxane (TIBAO) or hexaisobutylalumoxane (HIBAO). Triethylaluminum and tri-isobutylaluminum are especially preferred.

Preferably, the cocatalyst also comprises an external donor. Suitable electron donors known in the art include ethers, ketones, amines, alcohols, phenols, phosphines, and silanes. Examples of these compounds are given, among others, in WO 95/32994, U.S. Pat. Nos. 4,107,414, 4,186,107, 4,226, 963, 4,347,160, 4,382,019, 4,435,550, 4,465,782, 4,472,524, 4,473,660, 4,552,930, 4,530,912, 4,532,313, 4,560,671, and 4,657,882. Electron donors consisting of organosilane compounds, containing Si—OCOR, Si—OR, or $S_1$—$NR_2$ bonds, having silicon as the central atom, and R is an alkyl, alkenyl, aryl, arylalkyl or cycloalkyl with 1 to 20 carbon atoms are known in the art and are especially preferred. Such compounds are described in U.S. Pat. Nos. 4,472,524, 4,522,930, 4,560,671, 4,581,342, 4,657,882, EP 0 045 976 and EP 0 045 977.

The catalyst may also be pretreated, such as prepolymerised so that it contains up to 5 g of prepolymer per gram of solid catalyst component. For example, the catalyst may contain one or two grams of poly(vinylcyclohexane) per gram of solid catalyst component. This allows the preparation of nucleated polypropylene as disclosed in EP 0607703, EP 1028984, EP 1028985, and EP 1030878.

Within the present invention, it is possible that the process only comprises a single reactor (i.e. the polymerisation reactor R1). However, it is also possible that the process includes additional reactors, e.g. a prepolymerisation reactor as already discussed above, one or more additional slurry reactors, in particular loop reactors, and/or at least one additional gas phase reactor.

In a preferred embodiment, the process further comprises the preparation of a propylene homo- or copolymer, preferably a propylene homopolymer, in a polymerisation reactor R2 which can be upstream or downstream of the polymerisation reactor R1.

Preferably, the polymerisation reactors R1 and R2 are in serial configuration.

Exemplary reactor types for R2 include e.g. gas phase reactors or loop reactors. However, other commonly known types of reactors can be used as well.

Just like the polymerisation reactor R1, R2 can be operated with a varying ethylene feed, optionally in combination with a varying hydrogen feed. Alternatively, it may be preferred that both ethylene feed and hydrogen feed to the reactor R2 are kept on a constant level.

Preferably, the polymer produced in the polymerisation reactor R2 is a propylene homopolymer which is then transferred to the polymerisation reactor R1, where the propylene copolymer P1 is prepared in the presence of the propylene homopolymer.

Just like in the polymerisation reactor R1, a single site catalyst such as a metallocene catalyst or a Ziegler-Natta catalyst can be used in reactor R2. Preferably, a Ziegler-Natta catalyst is used in the polymerisation reactor R2. Reference can be made to the statements provided above when describing the Ziegler-Natta catalyst used in reactor R1.

Preferably, the same Ziegler-Natta catalyst is used in the polymerisation reactors R1 and R2.

In the present invention, it may be preferred to provide a further polymerisation reactor R3, preferably a gas phase reactor, downstream to R1, wherein a propylene homo- or copolymer, preferably an ethylene/propylene rubber is prepared in polymerisation reactor R3.

According to a further aspect, the present invention provides a propylene copolymer P2, having an amount of ethylene-derived comonomer units of from 1.5 to 5.0 wt %, more preferably 2.0 to 4.5 wt %, an MFR(230° C., 2.16 kg) of from 0.1 to 5.0 g/10 min, more preferably 0.5 to 4.0 g/10 min, even more preferably 1.0 to 3.0 g/10 min, and a shear thinning index SHI(0/50) of from 7.5 to 10.

As discussed below in further detail when describing the measuring methods, the shear thinning index is a rheological parameter indicating the width of the molecular weight distribution.

The propylene copolymer P2 is obtainable by the process of the present invention. Thus, it can be prepared by using the polymerisation reactor R1 only. However, the propylene copolymer P2 is preferably obtained by additionally using one or more of the optional reactors described above, i.e. a prepolymerisation reactor $R_P$, a polymerisation reactor $R_2$, and/or a polymerisation reactor $R_3$ which preferably is a gas phase reactor.

Preferably, the propylene copolymer P2 has an MFR(230° C., 5 kg) of from 0.5 to 15 g/10 min, more preferably 2 to 15 g/10 min.

Preferably, the propylene copolymer P2 has a weight average molecular weight Mw of from 300000 g/mol to 650000 g/mol.

The present invention will now be described in further detail by making reference to the examples provided below.

EXAMPLES

1. Measuring Methods
1.1 Mw, Mn, MWD

Weight average molecular weight (Mw), number average molecular weight (Mn) and thus molecular weight distribution (MWD=Mw/Mn) were determinated by size exclusion chromatography (SEC) based on standard test methods ISO 16014-2:2003 and ISO 16014-4:2003.

The molecular weight averages and molecular weight distribution were measured on a Waters Alliance GPCV2000 SEC instrument with on-line viscometer at 140 degrees Celsius using 1,2,4-trichlorobenzene (TCB) stabilized with 2,6-di-tert-butyl-4-methylphenol (BHT) as an eluent. A set of two mixed beds and one 107 Å TSK-Gel columns from TosoHaas was used and the system was calibrated with NMWD polystyrene standards (from Polymer laboratories).

1.2 Melt Flow Rate MFR

Melt flow rate was measured according to ISO 1133, either at 230° C. and 2.16 kg (MFR(2.16 kg,230° C.)), at 230° C. and 5 kg (MFR(5 kg,230° C.)), or at 230° C. and 10 kg (MFR(10 kg,230° C.)).

1.3 Comonomer Content in Polymer

Comonomer content (wt %) was determined in a known manner based on Fourier transform infrared spectroscopy (FTIR) determination calibrated with $^{13}$C-NMR.

1.4 Shear Thinning Index SHI (0/50)

The SHI is the ratio of the complex viscosity ($\eta^*$) at two different shear stresses and is a measure of the broadness (or narrowness) of the molecular weight distribution. The shear thinning index SHI0/50 is the ratio of the complex viscosity at 200° C. and a shear stress of 0 kPa ($\eta^*0$) and the complex viscosity at 200° C. and a shear stress of 50 kPa ($\eta^*50$).

Dynamic rheological measurements were carried out with Rheometrics RDA II QC on compression molded samples under nitrogen atmosphere at 200° C. using 25 mm-diameter plate and plate geometry. The oscillatory shear experiments were done with the linear viscoelastic range of strain at frequencies from 0.01 to 500 rad/s. (ISO6721-1).

The values of storage modulus (G'), loss modulus (G"), complex modulus (G*) and complex viscosity ($\eta^*$) were obtained as a function of frequency ($\omega$).

The Zero shear viscosity ($\eta0$) was calculated using complex fluidity defined as the reciprocal of complex viscosity. The real and imaginary parts are thus defined by $$f'(\omega)=\eta'(\omega)/[\eta'(\omega)^2+\eta''(\omega)^2] \text{ and}$$

$$f''(\omega)=\eta''(\omega)/[\eta'(\omega)^2+\eta''(\omega)^2]$$

from the following equations $$\eta'=G''/\omega \text{ and } \eta''=G'/\omega$$

$$f'(\omega)=G''(\omega)\cdot\omega/[G'(\omega)^2+G''(\omega)^2]$$

$$f''(\omega)=G'(\omega)\cdot\omega/[G'(\omega)^2+G''(\omega)^2]$$

1.5 Melting Temperature, Crystallisation Temperature

Melting temperature Tm and crystallization temperature Tcr were measured with Mettler TA820 differential scanning calorimetry (DSC) on 3±0.5 mg samples. Both crystallization and melting curves were obtained during 10° C./min cooling and heating scans between 30° C. and 225° C. Melting and crystallization temperatures were taken as the peaks of endotherms and exotherms.

1.6 Xylene Solubles (XS)

The xylene solubles (XS, wt %) were measures as follows: 2.0 g of polymer was dissolved in 250 ml p-xylene at 135° C. under agitation. After 30±2 minutes the solution was allowed to cool for 15 minutes at ambient temperature and then allowed to settle for 30 minutes at 25±0.5° C. The solution was filtered and evaporated in nitrogen flow and the residue dried under vacuum at 90° C. until constant weight is reached.

$$XS\% = (100 \times m1 \times v0)/(m0 \times v1), \text{ wherein}$$

m0=initial polymer amount (g)
m1=weight of residue (g)
v0=initial volume (ml)
V1=volume of analyzed sample (ml)

2. Examples 1-2 and Comparative Example

2.1 Example 1

In a prepolymerisation reactor Rp (T: 30° C.; P: 55 bar), which was a loop reactor, a polypropylene was prepared first. Propylene feed rate: 65 kg/h; hydrogen feed rate: 0.03 g/h.

Subsequently, the polypropylene was transferred to the polymerisation reactor R1 (again a loop reactor, T: 70° C.; P: 54.5 bar) in which a propylene copolymer P1 was produced under dynamic feed of ethylene and fixed feed of hydrogen. The minimum ethylene feed was 0.5 kg/h and the maximum 2.75 kg/h. The hydrogen feed was constantly held at 20 g/h. The propylene feed was 148 kg/h.

The average residence time in polymerisation reactor R1 was 0.57 h.

In polymerisation reactor R1, catalyst productivity was 13.3 kg/g and production rate was 30 kg/h.

The amount of ethylene fed to the polymerisation reactor R1, which was a loop reactor, was varied in the form of a rectangular function by periodically switching on/off ethylene feed.

The catalyst used in Example 1 was prepared as follows:

First, 0.1 mol of $MgCl_2 \times 3$ EtOH was suspended under inert conditions in 250 ml of decane in a reactor at atmospheric pressure. The solution was cooled to −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After addition of phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. The obtained solid contained 1.9 wt % of titanium.

Table 1 below shows the properties of the final propylene copolymer P2 obtained in Example 1. The rheology shows clear indication for broader MWD.

2.2 Example 2

In a prepolymerisation reactor $R_P$ (T: 30° C.; P: 55 bar), which was a loop reactor, a polypropylene was prepared first. The propylene feed was 64 kg/h, and the hydrogen feed was 0.03 g/h.

Subsequently, the polymer was transferred to the polymerisation reactor R1 (again a loop reactor; T: 70° C.; P: 55.5 bar) in which a propylene copolymer P1 was produced under dynamic H2 and C2 feed. The minimum H2 feed was 5 g/h and the maximum H2 feed was 20 g/h. The C2 feed was minimum 500 g/h and maximum 2750 g/h.

The propylene feed was 146 kg/h. The feeds were out of phase with a phase shift of 180° and an oscillation period of 15 min.

The average residence time in polymerisation reactor R1 was 0.7 h.

In polymerisation reactor R1, catalyst productivity was 10.7 kg/g and production rate was 30 kg/h.

The amounts of ethylene and hydrogen fed to the polymerisation reactor R1, which was a loop reactor, were varied in the form of a rectangular function by periodically switching on/off hydrogen/ethylene feed.

The catalyst used corresponds to the one as described in Example 1.

Table 1 shows the properties of the final propylene copolymer P2 obtained in Example 2. Rheology shows increased broadness of the MWD.

2.3 Comparative Example

In a prepolymerisation reactor $R_P$ (T: 30° C.; P: 55.5 bar), which was a loop reactor, a polypropylene was prepared first. The propylene feed was 64 kg/h, and the hydrogen feed was 3.6 g/h.

Subsequently, the polymer was transferred to the polymerisation reactor R1 (again a loop reactor; T: 70° C.; P: 54.5 bar) in which a propylene copolymer P1 was produced under fixed feeds of ethylene and hydrogen. The ethylene feed was constantly held at 1.5 kg/h, and the hydrogen feed was constantly held at 9 g/h. The propylene feed was 147 kg/h.

The average residence time in polymerisation reactor R1 was 0.62 h.

The catalyst used was the same as described in Example 1.

In polymerisation reactor R1, catalyst productivity was 12.5 kg/g and production rate was 33.5 kg/h.

Data about the final propylene copolymer P2 obtained in the Comparative Example are provided in Table 1.

The data provided above clearly demonstrate that dynamic operation of the polymerisation reactor R1 with varying ethylene feed/constant hydrogen feed or varying ethylene feed/varying hydrogen feed results in a significant broadening of the molecular weight distribution (see SHI(0/50) values). Furthermore, catalyst productivity can still be kept on a high level.

We claim:

1. A process for the preparation of a propylene copolymer P1 having ethylene-derived comonomer units, which comprises the following steps:
   (i) introducing propylene, ethylene, and hydrogen into a polymerisation reactor R1, wherein the ethylene is fed to the polymerisation reactor R1 in a periodically varying amount,
   (ii) preparing the propylene copolymer in the polymerisation reactor R1 in the presence of a catalyst
   wherein a prepolymerisation step in a prepolymerisation reactor $R_P$ is carried out before step (i), which includes introducing propylene, ethylene, and hydrogen into the prepolymerisation reactor $R_P$, wherein the ethylene feed is provided in a periodically varying amount.

2. The process according to claim 1, wherein the hydrogen is fed to the polymerisation reactor R1 and/or the prepolymerisation reactor $R_P$ in a periodically varying amount.

3. The process according to claim 1, wherein the amount of ethylene and optionally the amount of hydrogen in the feed stream(s) to the polymerisation reactor R1 and/or the prepolymerisation reactor $R_P$ varies/vary as a function of time in the form of a non-sinusoidal function or in the form of a sinusoidal function.

4. The process according to claim 1, wherein the oscillation period $t_{OP}$(C2-feed) of the varying ethylene feed to the polymerisation reactor R1 and/or the prepolymerisation reactor $R_P$ is from 5 minutes to 90 minutes.

5. The process according to claim 1, wherein the polymerisation reactor R1 has an average residence time $t_{RT-1}$, and the ratio of the oscillation period $t_{OP}$(C2-feed) to the average residence time $t_{RT-1}$ is within the range of 0.2 to 2.0.

6. The process according to claim 1, wherein ethylene as well as hydrogen are fed to the polymerisation reactor R1 and/or the prepolymerisation reactor $R_P$ in varying amounts, and the the oscillation period $t_{OP}$(C2-feed) of the ethylene feed and the oscillation period $t_{OP}$(H2-feed) of the hydrogen feed are the same.

7. A process for the preparation of a propylene copolymer P1 having ethylene-derived comonomer units, which comprises the following steps:
   (i) introducing propylene, ethylene, and hydrogen into a polymerisation reactor R1, wherein the ethylene and hydrogen are fed to the polymerisation reactor R1 in a periodically varying amount,

TABLE 1

| | Random PPs with dynamic operation and with fixed feed stream | | | | | | | | | | |
|---|---|---|---|---|---|---|---|---|---|---|---|
| Lot | Osc. Period min | MFR2 g/10 min | C2 Wt % | XS | Tm ° C. | Tcr ° C. | Mn kg/mol | Mw kg/mol | PDI — | SHI (0/50) | G' 2 KPA |
| Comp. Ex. | — | 0.9 | 2.6 | 5.1 | 150.7 | 114.8 | 118.0 | 591 | 5.0 | 7.3 | 523.2 |
| Ex. 1 | C2: 15 min | 2.7 | 3.0 | 5.9 | 150.1 | 114.4 | 57.7 | 388 | 6.7 | 9.0 | 593.7 |
| Ex. 2 | C2/H2: 15 min. | 1.7 | 2.8 | 6.0 | 150.2 | 111.6 | 73.4 | 508 | 6.9 | 8.6 | 562.5 |

(ii) preparing the propylene copolymer in the polymerisation reactor R1 in the presence of a catalyst,
wherein the periodically varying ethylene feed and the periodically varying hydrogen feed are phase-shifted by 160° to 200°.

8. A process for the preparation of a propylene copolymer P1 having ethylene-derived comonomer units, which comprises the following steps:
(i) introducing propylene, ethylene, and hydrogen into a polymerisation reactor R1, wherein the ethylene and hydrogen are fed to the polymerisation reactor R1 in a periodically varying amount,
(ii) preparing the propylene copolymer in the polymerisation reactor R1 in the presence of a catalyst,
wherein the periodically varying ethylene feed and the periodically varying hydrogen feed are in phase.

9. The process according to claim 1, wherein the maximum hydrogen to propylene feed ratio to the reactor R1 is from 0.02 mol/kmol to 2.0 mol/kmol; and the minimum hydrogen to propylene feed ratio is from 0 mol/kmol to 50% of the maximum hydrogen to propylene feed ratio.

10. The process according to claim 1, wherein the polymerisation reactor R1 is a loop reactor.

11. The process according to claim 1, wherein the catalyst used in the polymerisation reactor R1 is a Ziegler-Natta catalyst.

12. The process according to claim 1, wherein the propylene copolymer P1 has an amount of ethylene-derived comonomer units within the range of 0.5 wt % to 5.0 wt %.

13. The process according to claim 1, wherein at least one polymerisation reactor R2 is provided downstream or upstream to the polymerisation reactor R1.

14. The process according to claim 13, wherein the polymerisation reactor R2 is a gas phase reactor which is provided downstream to R1, and wherein a propylene copolymer is prepared in the polymerisation reactor R2.

15. The process according to claim 1, wherein the propylene copolymer P1 has an amount of ethylene-derived comonomer units of from 0.5 to 5.0 wt %, an MFR(230° C., 2.16 kg) of from 0.1 to 5.0 g/10 min, and a shear thinning index SHI(0/50) of from 7.5 to 10.

16. The process according to claim 1, wherein the oscillation period $t_{OP}$(C2-feed) of the varying ethylene feed to the polymerisation reactor R1 and/or the prepolymerisation reactor $R_p$ is from 10 to 60 minutes.

17. The process according to claim 1, wherein the oscillation period $t_{OP}$(C2-feed) of the varying ethylene feed to the polymerisation reactor R1 and/or the prepolymerisation reactor $R_p$ is from 10 to 40 minutes.

18. The process according to claim 1, wherein the polymerisation reactor R1 has an average residence time $t_{RT-1}$, and the ratio of the oscillation period $t_{OP}$(C2-feed) to the average residence time $t_{RT-1}$, is within the range of 0.25 to 1.0.

19. The process according to claim 1, wherein the hydrogen is fed to the polymerisation reactor R1 in a periodically varying amount, and wherein the periodically varying ethylene feed and the periodically varying hydrogen feed are phase-shifted by 180°.

20. The process according to claim 1, wherein the maximum hydrogen to propylene feed ratio to the reactor R1 is from 0.02 mol/kmol to 2.0 mol/kmol; and the minimum hydrogen to propylene feed ratio is 0 mol/kmol.

21. The process according to claim 1, wherein the maximum hydrogen to propylene feed ratio to the reactor R1 is from 0.05 mol/kmol to 1.5mol/kmol; and the minimum hydrogen to propylene feed ratio is from 0 mol/kmol to 50% of the maximum hydrogen to propylene feed ratio.

22. The process according to claim 1, wherein the maximum hydrogen to propylene feed ratio to the reactor R1 is from 0.05 mol/kmol to 1.5 mol/kmol; and the minimum hydrogen to propylene feed ratio is 0 mol/kmol.

23. The process according to claim 1, wherein the propylene copolymer P1 has an amount of ethylene-derived comonomer units within the range of 1.0 wt % to 4.5 wt %.

24. The process according to claim 1, wherein the propylene copolymer P1 has an amount of ethylene-derived comonomer units of from 0.5 to 5.0 wt %, an MFR(230° C., 2.16 kg) of from 0.5 to 4.0 g/10 min, and a shear thinning index SHI(0/50) of from 7.5 to 10.

25. The process according to claim 1, wherein the propylene copolymer P1 has an amount of ethylene-derived comonomer units of from 0.5 to 5.0 wt %, an MFR(230° C., 2.16 kg) of from 1.0 to 3.0 g/10 min, and a shear thinning index SHI(0/50) of from 7.5 to 10.

26. The process according to claim 1, wherein the propylene copolymer P1 has an amount of ethylene-derived comonomer units of from 1.0 to 4.5 wt %, an MFR(230° C., 2.16 kg) of from 0.1 to 5.0 g/10 min, and a shear thinning index SHI(0/50) of from 7.5 to 10.

27. The process according to claim 1, wherein the propylene copolymer P1 has an amount of ethylene-derived comonomer units of from 1.0 to 4.5 wt %, an MFR (230° C., .16 kg) of from 0.5 to 4.0 g/10 min, and a shear thinning index SHI(0/50) of from 7.5 to 10.

28. The process according to claim 1, wherein the propylene copolymer P1 has an amount of ethylene-derived comonomer units of from 1.0 to 4.5 wt %, an MFR(230° C., 2.16 kg) of from 1.0 to 3.0 g/10 min, and a shear thinning index SHI(0/50) of from 7.5 to 10.

29. The process according to claim 1, wherein a prepolymerisation step in a prepolymerisation loop reactor $R_P$ is carried out before step (i), which includes introducing propylene, ethylene, and hydrogen into the prepolymerisation reactor $R_P$, wherein the ethylene feed is provided in a periodically varying amount.

30. The process according to claim 1, wherein the amount of ethylene and optionally the amount of hydrogen in the feed stream(s) to the polymerisation reactor R1 and/or the prepolymerisation reactor $R_P$ varies/vary as a function of time in the form of the group consisting of a sawtooth function, a triangle function, a rectangular function, one or more pulse functions, one or more step functions, and any combination thereof.

* * * * *